(12) United States Patent
Cunningham et al.

(10) Patent No.: US 9,145,118 B2
(45) Date of Patent: *Sep. 29, 2015

(54) METHOD AND SYSTEM FOR REDUCING VACUUM USE IN A VEHICLE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US); Russ William Ferguson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

This patent is subject to a terminal disclaimer.

(21) Appl. No.: 13/943,431

(22) Filed: Jul. 16, 2013

(65) Prior Publication Data

US 2015/0021141 A1  Jan. 22, 2015

(51) Int. Cl.
*B60W 10/06* (2006.01)
*B60W 10/11* (2012.01)
*B60W 10/18* (2012.01)
*B60T 8/17* (2006.01)
*B60T 13/565* (2006.01)
*B60T 13/72* (2006.01)
*B60W 10/10* (2012.01)
*B60W 30/18* (2012.01)
*B60T 13/46* (2006.01)
*B60T 17/02* (2006.01)
*F02M 35/10* (2006.01)
*F02D 29/02* (2006.01)
*F02N 11/08* (2006.01)

(52) U.S. Cl.
CPC . *B60T 8/17* (2013.01); *B60T 13/46* (2013.01); *B60T 13/565* (2013.01); *B60T 13/72* (2013.01); *B60T 17/02* (2013.01); *B60W 10/06* (2013.01); *B60W 10/10* (2013.01); *B60W 10/18* (2013.01); *B60W 30/18109* (2013.01); *F02D 29/02* (2013.01); *F02M 35/10229* (2013.01); *F02D 2250/41* (2013.01); *F02N 11/0818* (2013.01); *Y10T 137/0318* (2015.04)

(58) Field of Classification Search
CPC ..... B60W 10/06; B60W 10/11; B60W 10/18; B60W 30/18109; B60T 8/17; B60T 13/565; B60T 13/72; Y10T 477/814; Y10T 477/869
USPC .......................................... 701/53, 54, 58, 61
See application file for complete search history.

(56) References Cited

U.S. PATENT DOCUMENTS

| | | | |
|---|---|---|---|
| 5,091,857 A * | 2/1992 | Katayama et al. | 701/112 |
| 6,272,969 B1 * | 8/2001 | Zeuner et al. | 91/367 |
| 7,152,933 B2 | 12/2006 | Collins et al. | |
| 7,475,951 B2 | 1/2009 | Ichikawa | |

(Continued)

OTHER PUBLICATIONS

Cunningham, Ralph Wayne et al., "Method and System for Reducing Vacuum Consumption in a Vehicle," U.S. Appl. No. 13/943,189, filed Jul. 16, 2013, 39 pages.

*Primary Examiner* — Edwin A Young
(74) *Attorney, Agent, or Firm* — Julia Voutyras; Alleman Hall McCoy Russell & Tuttle LLP

(57) ABSTRACT

A system and method for conserving vacuum within a vehicle is described. In one example, a vacuum level in a working chamber of a vacuum operated brake booster is controlled so as to limit vacuum consumption.

20 Claims, 4 Drawing Sheets

(56) References Cited

U.S. PATENT DOCUMENTS

| | | | |
|---|---|---|---|
| 2005/0218716 A1* | 10/2005 | Collins et al. | 303/115.3 |
| 2010/0193311 A1* | 8/2010 | Calnek et al. | 188/357 |
| 2011/0132311 A1* | 6/2011 | Pursifull et al. | 123/184.56 |
| 2011/0178687 A1 | 7/2011 | Anderson et al. | |
| 2013/0060442 A1 | 3/2013 | Kaster et al. | |

* cited by examiner

METHOD AND SYSTEM FOR REDUCING VACUUM USE IN A VEHICLE

BACKGROUND/SUMMARY

Vacuum may be used in a vehicle to apply motive force in vehicle systems. For example, vacuum may be used to apply vehicle brakes, operate a turbocharger waste gate, adjust valve positions in heating and ventilation ducts. However, vacuum in vehicle systems is becoming a less available resource due to the trend of engine downsizing and variable valve timing to improve vehicle fuel economy.

One of the more significant consumers of vacuum in a vehicle is the vehicle brake system. Vacuum is used in a brake booster to apply brakes. In particular, vacuum is applied to both sides of a brake booster diaphragm when brakes are not applied. Pressure equalization across the diaphragm allows the diaphragm to return to a position where a piston in the master cylinder does not increase brake line pressure. When the brakes are applied, vacuum on a working side of the diaphragm is displaced with ambient air while vacuum remains present on the vacuum side of the diaphragm. Consequently, a pressure differential is produced across the diaphragm that motivates the diaphragm to apply force to the piston in the master cylinder, thereby increasing brake pressure and applying the brakes.

During vehicle braking, a driver receives visual and physical cues that allow the driver to know whether or not a proper amount of force is being applied to the brake pedal to provide the desired braking amount or level. However, when the vehicle is stopped, the driver receives much less information regarding whether or not braking force is adequate or more than is desired to keep the vehicle from moving. Consequently, the driver may apply more brake force than is desired to keep the vehicle from moving. As a result, more vacuum than is desired may be consumed when the vehicle is stopped.

The inventors herein have recognized the above-mentioned disadvantages and have developed a method for conserving vacuum, comprising: providing vacuum to a brake booster to apply vehicle brakes when a vehicle is stopped; and reducing or stopping brake booster vacuum consumption in response to a vacuum level in a working chamber of the brake booster being less than a threshold vacuum level that stops the vehicle from moving.

By selectively allowing air to flow into a vacuum brake booster when a vehicle is stopped or traveling at less than a threshold vehicle speed, the technical result of conserving vacuum in a vacuum system may be provided while at the same time effective braking is supplied to a vehicle. For example, if a driver is requesting more brake force than is required to hold a vehicle in place, air flow into a working side of a vacuum brake booster may be reduced or limited so that vacuum is not consumed by the vacuum brake booster. In one example, vacuum in the vacuum brake booster working chamber is allowed to be limited to a threshold vacuum that holds the vehicle in a stopped state while the brake pedal force is increased. Limiting the air entering the working chamber reduces vacuum consumption. Additionally, limiting the stroke of the brake booster diaphragm reduces vacuum consumption. By limiting air entering the working chamber, the amount of vacuum assist provided to the braking system is reduced. In some examples, vacuum assist may be limited while the driver may be allowed to apply as much unassisted master cylinder force and brake line pressure as he or she wishes. Whether or not the specific brake system design allows unassisted brake force, limiting the brake booster working chamber air pressure limits braking force and brake booster vacuum consumption. Though limited, the brake force allowed is sufficient to stop the vehicle from moving via engine torque and/or road grade. In one example, the method is carried out during stopped vehicle conditions when vehicle speed is zero and a driver is intending to maintain zero vehicle speed.

The present description may provide several advantages. In particular, the approach may conserve vacuum in a vehicle so that the vehicle's engine operates for less time at low intake manifold pressures. The approach may also conserve fuel since the engine may be able to operate more efficiently at higher intake manifold pressures for longer periods of time. Additionally, the approach conserves vacuum responsive to vehicle operating conditions such as road grade and vehicle mass.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
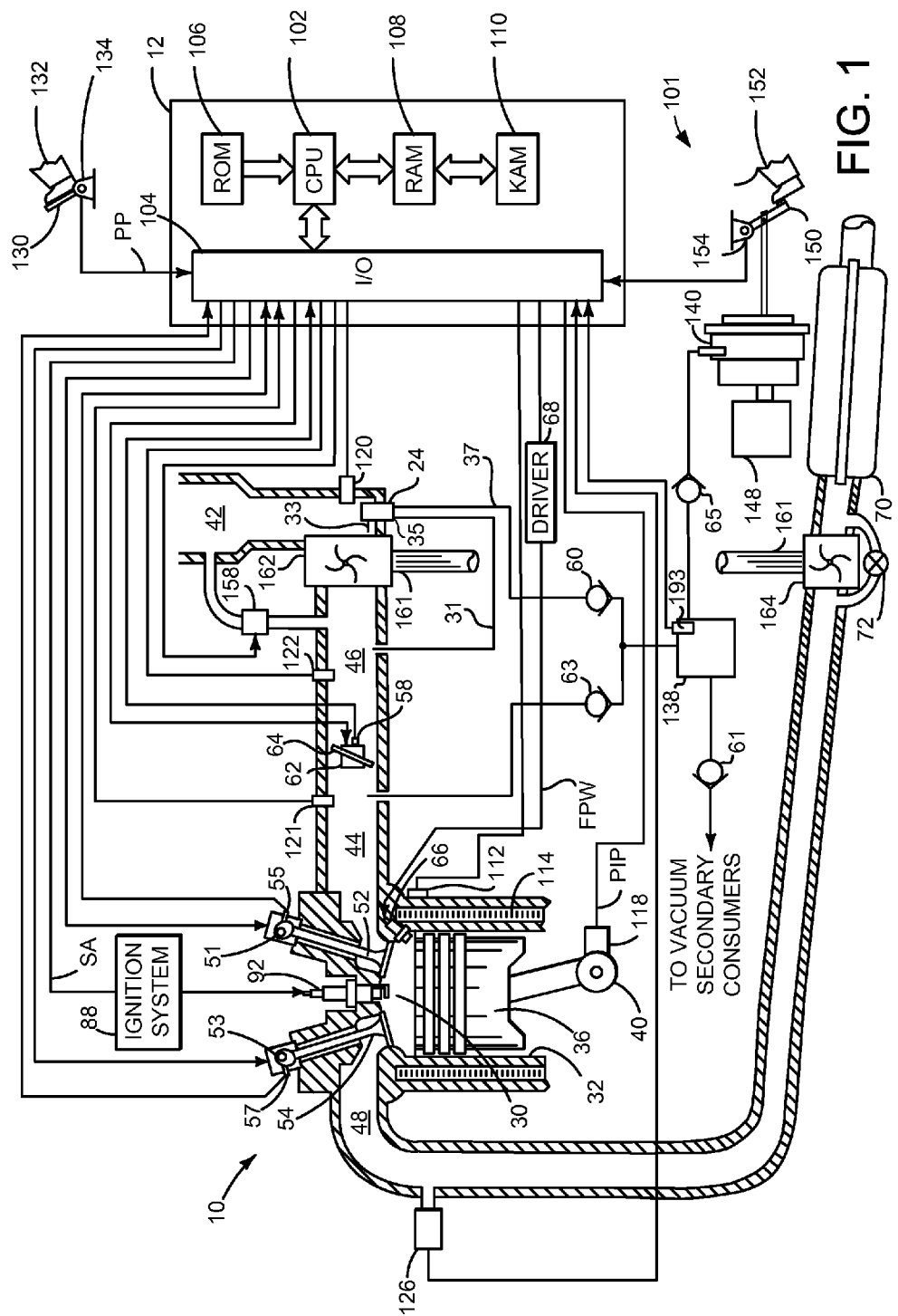
FIG. 1 shows a schematic depiction of an engine and a portion of a braking system.
Figure 2:
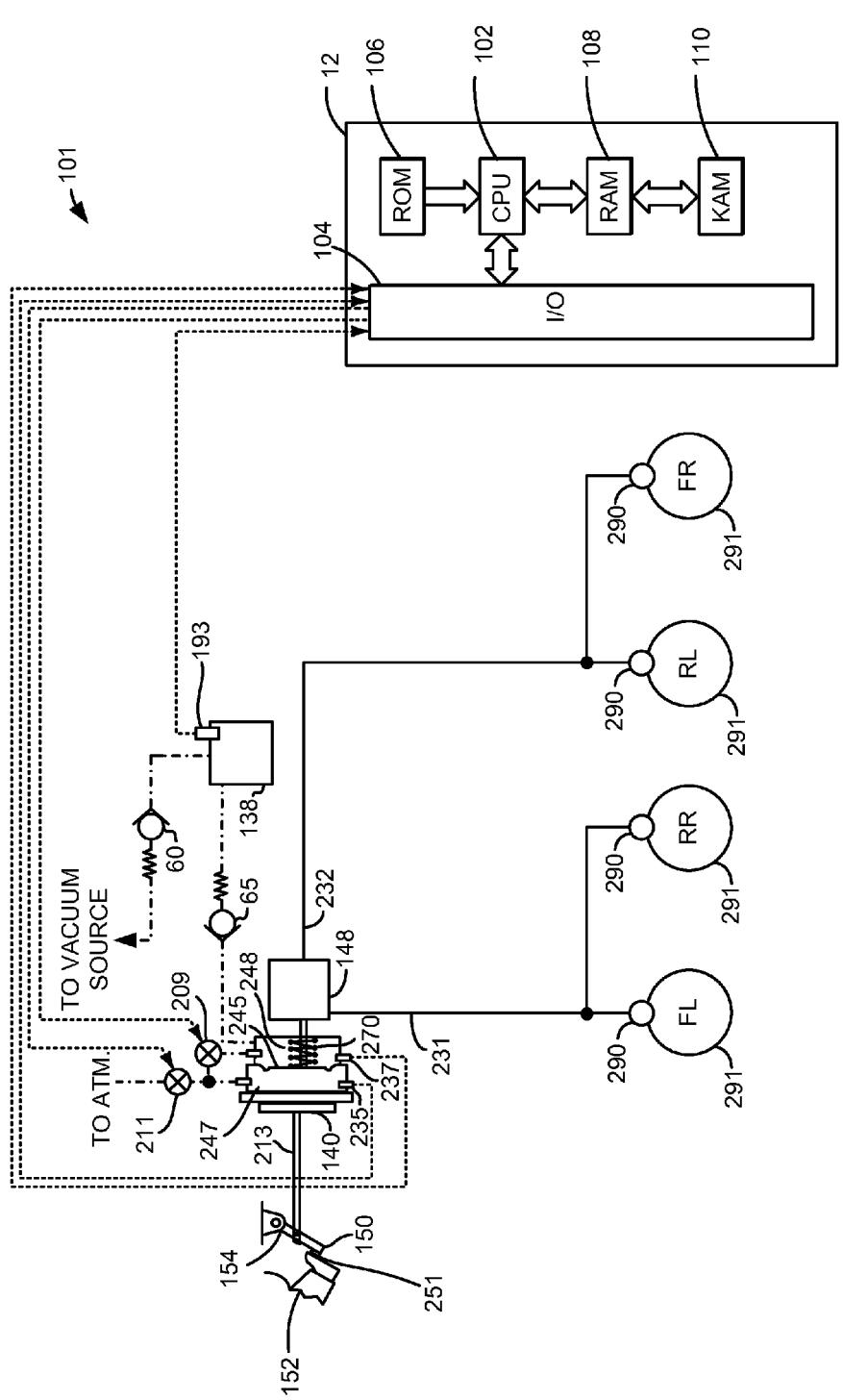
FIG. 2 shows an example vehicle braking system where the method of FIG. 4 may be applied to conserve vacuum.
Figure 3:
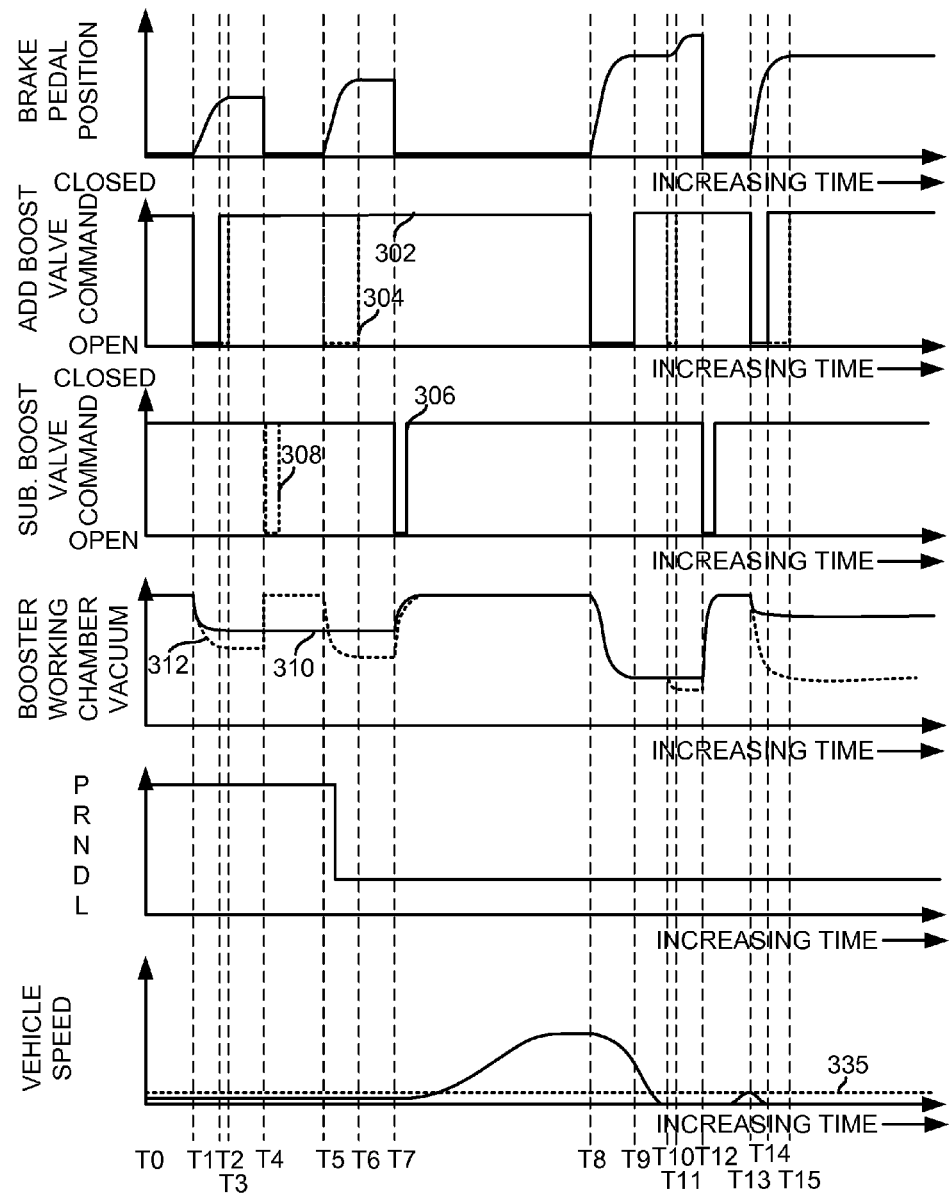
FIG. 3 shows an example operating sequence where vacuum of a vacuum system is conserved.
Figure 4:
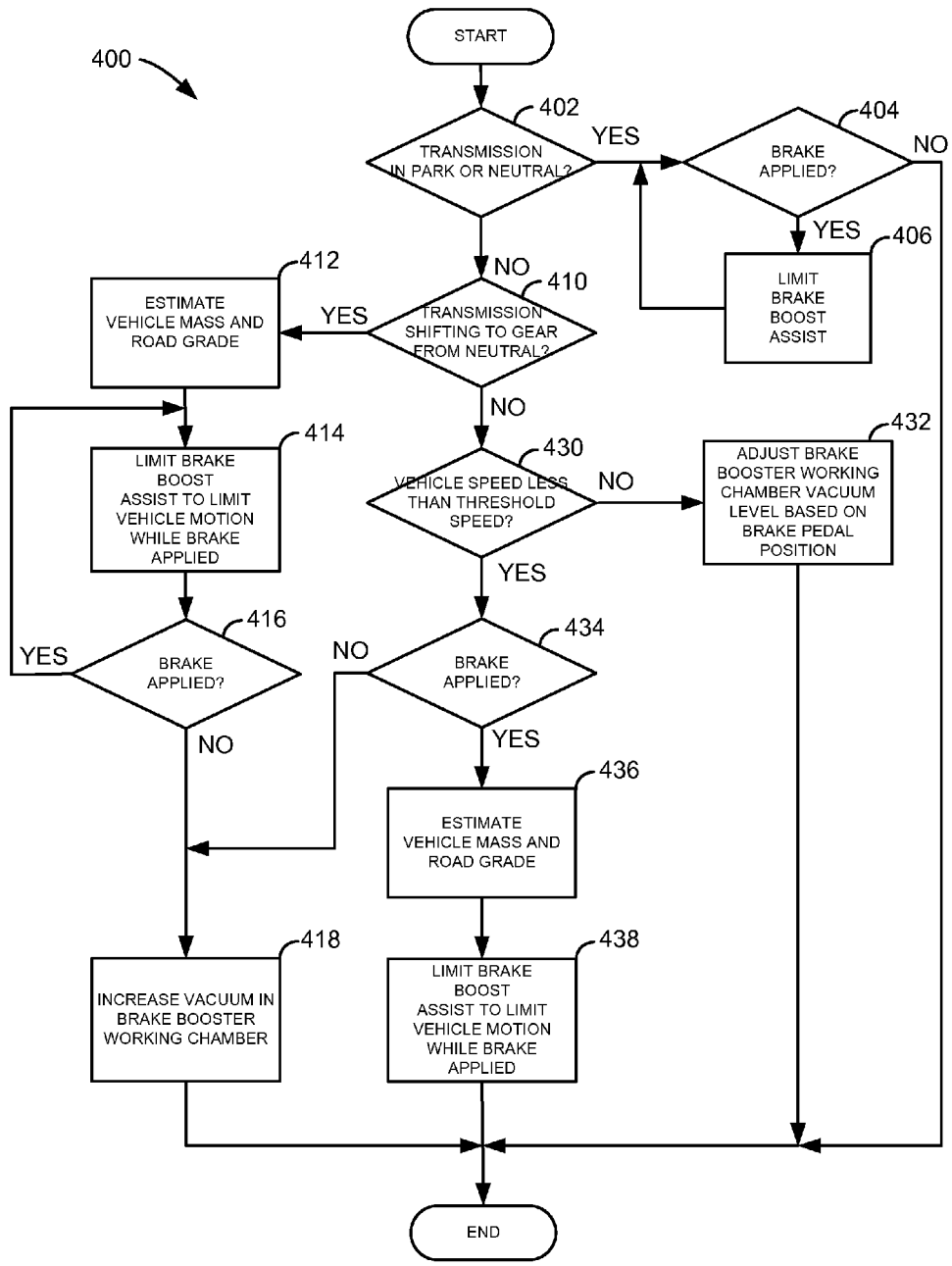
FIG. 4 shows an example method for conserving vacuum.

The present description is related to conserving vacuum for a vehicle. FIGS. 1 and 2 show an example system for providing vacuum for a vehicle. FIG. 3 shows an example sequence where vacuum is conserved while operating a vehicle. FIG. 4 shows a method for conserving vacuum for use in vehicle systems.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown).

Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 158 may be electrically operated via a signal from controller 12. Compressor bypass valve 158 allows pressurized air to be circulated back to the compressor inlet to limit boost pressure. Similarly, waste gate actuator 72 allows exhaust gases to bypass turbine 164 so that boost pressure can be controlled under varying operating conditions.

Vacuum is supplied to vehicle systems via vacuum providing device 24 (e.g. an aspirator/ejector/venturi pump). Compressor 162 provides compressed air as a motive fluid via converging section duct 31 to converging section 35 of vacuum providing device 24 (e.g., an ejector). The motive fluid is combined with air from vacuum reservoir 138 via vacuum port duct 37 and check valve 60. Check valve 60 allows flow when the pressure produced via the ejector within vacuum port duct 37 is lower than the pressure within reservoir 138. Mixed air exits at diverging section 33. In some examples, vacuum reservoir 138 may be referred to as a vacuum system reservoir since it can supply vacuum throughout the vacuum system and since brake booster 140 may contain a vacuum reservoir too. Pressure in reservoir 138 may be monitored via vacuum reservoir pressure sensor 193. Vacuum system reservoir 138 provides vacuum to brake booster 140 via check valve 65. Check valve 65 allows air to enter vacuum system reservoir 138 from brake booster 140 and substantially prevents air from entering brake booster 140 from vacuum system reservoir 138. Vacuum system reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from secondary vacuum consumers (e.g., vacuum consumers other than the vehicle braking system) to vacuum system reservoir 138. Brake booster 140 may include an internal vacuum reservoir, and it may amplify force provided by foot 152 via brake pedal 150. Brake booster 140 is coupled to master cylinder 148 for applying vehicle brakes (not shown). Brake booster 140 and brake pedal 150 are part of vehicle braking system 101. In this example, brake booster 140 is an active brake booster where vacuum within a working side of brake booster 140 is based on a position of brake pedal 150. Brake pedal 150 may be mechanically coupled to brake booster 140 so that during some conditions brake pedal 140 directly operates master cylinder 148. During other conditions, brake fluid pressure produced by master cylinder 148 is based on the position of brake pedal 140, but brake pedal 140 does not directly operate master cylinder 148. If brake pedal 140 is not directly operating on master cylinder 148 and the brake pedal is applied, pressure in a working chamber of brake booster 140 is adjusted via adjusting valves described in FIG. 2.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a first example braking system where the method of FIG. 4 may be applied is shown. Braking system 101 of FIG. 2 may be included with the engine shown in FIG. 1. Hydraulic lines are shown solid, electrical connections are shown as dashed, and pneumatic connections are shown as dash-dot.

Braking system 101 includes a brake pedal 150 and a brake position sensor 154. In some examples, brake system 101 may also include a brake pedal force sensor 251. Brake pedal 150 may be operated by foot 152 to move rod 213. Rod 213 may be separated from brake booster 140 during low to medium rates of brake application, and rod 213 may be in contact with brake booster 140 during higher rates of brake application. During low to medium rates of brake application by a driver, valves 211 and 209 control a vacuum level in brake booster working chamber 247. It should be noted that apply valve 211 and release valve 209 may be realized in a single valve positioned by pulse width modulating a solenoid. During higher rates of brake application, valves 211 and 209 along with the position of rod 213 control the vacuum level in brake booster working chamber 247. Diaphragm 245 is mechanically coupled to master cylinder 148. At low to middle level brake application rates, vacuum level in brake booster working chamber adjusts the position of diaphragm 245, thereby controlling brake fluid pressure produced by master cylinder 148. At higher level brake application rates, fluid is displaced between rod 213 and diaphragm 247 which allows foot 152 and valve 211 to increase force applied to diaphragm 245 so that brake fluid pressure in master cylinder 148 is increased.

Brake booster 140 includes a working chamber 247, a vacuum chamber 248, and a return spring 270. In this example, working chamber 247 selectively receives air from a high pressure source (e.g., atmospheric pressure) via brake booster add boost valve 211 when brake booster add boost valve 211 is in an open state. Brake booster add boost valve 211 may open and brake booster subtract boost valve 209 may be closed in response to brake pedal 150 being applied. Brake booster add boost valve 211 may close and brake booster subtract boost valve 209 may be closed in response to brake pedal 150 being released. In this way, vacuum in working chamber 247 may be displaced or added so that additional force is applied or removed from diaphragm 247. Pressure sensor 235 senses pressure in working chamber 247. Pressure sensor 237 senses pressure in vacuum chamber 248. Controller 12 operates brake booster add boost valve 211 and brake booster subtract boost valve 209.

Vacuum reservoir 138 supplies vacuum to brake booster 140 via check valve 65. Pressure in vacuum reservoir 138 is sensed via pressure sensor 193. In some examples, vacuum reservoir 138 may be incorporated into brake booster 140. Vacuum is supplied to vacuum reservoir 138 via check valve 60. Vacuum is supplied to check valve 60 via the engine intake manifold or a device such as an ejector.

Master cylinder 148 may supply pressurized brake fluid to brakes 290 for stopping rotation of wheels 291. Brake lines 231 and 231 allow fluidic communication between master cylinder 148 and brakes 290. The front left vehicle wheel is designated FL, the front right wheel is designated FR, the right rear wheel is designated RR, and the rear left wheel is designated RL.

Thus, the system of FIGS. 1 and 2 provides for a system for conserving vacuum, comprising: a transmission; vehicle brakes; a brake pedal; a vacuum brake booster coupled to the brake pedal and in communication with the vehicle brakes; and a controller including executable instructions stored in non-transitory memory to limit vacuum consumption via the vacuum brake booster while the transmission is being shifted and while the brake pedal is applied. The system includes where the transmission is shifted from neutral or park into a forward gear. The system may further limit vacuum consumption during the initial engine start in while the transmission is in park. In some examples, the driver must apply the vehicle brake to start a "push button start" vehicle. Brake boost assist may be limited while the brake is applied, while the vehicle is in park, and when there is a request to start the engine via a switch or pushbutton. The system further comprises additional instructions to limit air flow into the vacuum brake booster when the transmission is in park and when the brake pedal is applied. The system further comprises additional instructions to automatically stop the engine and limit vacuum consumption via the vacuum brake booster while the engine is stopped. The system further comprises additional instructions to control a vacuum amount in a working chamber of the vacuum brake booster based on road grade. The system further comprises additional instructions to control the vacuum amount in the working chamber of the vacuum brake booster based on vehicle mass.

Referring now to FIG. 3, operating characteristics of the vacuum conservation method of FIG. 4 are shown. The sequence of FIG. 3 may be provided by the method of FIG. 4 being performed in the system of FIGS. 1 and 2. Vertical markers T0-T15 represent times of particular interest in the sequence.

The first plot from the top of FIG. 3 represents brake pedal position versus time. Alternatively, brake pedal force may be substituted for brake pedal position. The X axis represents time and time increases from the left side of FIG. 3 to the right side of FIG. 3. The Y axis represents brake pedal position and the brake pedal is in a base position at the X axis. The brake pedal displacement from its base position increases in the direction of the Y axis arrow. The brake pedal is not applied in the base position.

The second plot from the top of FIG. 3 represents brake booster add boost valve command versus time. The X axis represents time and time increases from the left side of FIG. 3 to the right side of FIG. 3. The Y axis represents brake booster add boost valve command and the brake booster add boost valve command requests to open the brake booster add boost valve when the trace is near the X axis. The brake booster add boost valve is closed when the trace is near the Y axis arrow. Air may be added to the brake booster working chamber when the brake booster add boost valve is open. Adding air to the brake booster working chamber increases brake fluid pressure in the master cylinder and consumes vacuum. Trace 302 is a solid line and it represents an add boost valve command according to the method of FIG. 4. Trace 304 is a dashed line and it represents an add boost valve command that is based solely on brake pedal position. Where only the solid line is visible, both traces 302 and 304 are at the same level.

The third plot from the top of FIG. 3 represents brake booster subtract boost valve command versus time. The X axis represents time and time increases from the left side of FIG. 3 to the right side of FIG. 3. The Y axis represents brake booster subtract boost valve command and the brake booster subtract boost valve command requests to open the brake booster subtract boost valve when the trace is near the X axis. The brake booster subtract boost valve is closed when the trace is near the Y axis arrow. Air may be removed from the brake booster working chamber when the brake booster subtract boost valve is open. Trace 306 is a solid line and it represents a subtract boost valve command according to the method of FIG. 4. Trace 308 is a dashed line and it represents an add boost valve command that is based solely on brake pedal position. Where only the solid line is visible, both traces 306 and 308 are at the same level.

The fourth plot from the top of FIG. 3 represents brake booster working chamber vacuum versus time. The X axis represents time and time increases from the left side of FIG. 3 to the right side of FIG. 3. The Y axis represents brake booster working chamber vacuum and brake booster working chamber vacuum increases (e.g., pressure decreases) in the direction of the Y axis arrow. Trace 310 is a solid line and it represents brake booster working chamber vacuum when the method of FIG. 4 in the system of FIGS. 1 and 2 controls vacuum in the brake booster working chamber. Trace 312 is a dashed line and it represents brake booster working chamber vacuum that is based solely on brake pedal position. Where only the solid line is visible, both traces 310 and 312 are at the same level.

The fifth plot from the top of FIG. 3 represents selected transmission gear versus time. The X axis represents time and time increases from the left side of FIG. 3 to the right side of FIG. 3. The Y axis represents transmission gear. P represents park, R represents reverse, N represents neutral, D represents drive, and L represents low. The vehicle's transmission is in the gear represented by the level of the trace.

The sixth plot from the top of FIG. 3 represents vehicle speed versus time. The X axis represents time and time increases from the left side of FIG. 3 to the right side of FIG. 3. The Y axis represents vehicle speed and vehicle speed increases in the direction of the Y axis arrow. Vehicle speed is zero when the trace is near the X axis. Horizontal line 335 represents a threshold vehicle speed below which the add vacuum valve may be closed responsive to brake pedal position and vehicle speed. In other words, if the brake pedal is applied and vehicle speed is less than threshold 335, the add brake valve may be closed to limit vacuum consumption to a threshold level that stops the vehicle but that does not continue to consume vacuum as the brake pedal is applied further.

At time T0, the vehicle is stopped and the transmission is in park. The add boost valve is closed and so is the subtract boost valve. The brake pedal is not applied and the transmission is in park. The brake booster working chamber vacuum is at a higher level. Such conditions are indicative of conditions when a vehicle is parked and the engine is operating.

At time T1, the brake pedal is applied while the transmission is still in park. The brake booster add boost valve is opened for traces 302 and 304 in response to the brake pedal being applied. The brake booster subtract boost valve is closed for traces 306 and 308 since the brake is applied. The brake booster working chamber vacuum decreases for traces 310 and 312 in response to the brake pedal being applied and the brake booster add boost valve opening. The transmission remains in park and the vehicle remains stopped. Such conditions may be present when a person subconsciously applies the vehicle brake while the vehicle is parked.

At time T2, the add brake boost valve is closed for trace 302 when brake booster working chamber pressure reaches a threshold vacuum level that would stop the vehicle from moving even if the vehicle was not parked. However, in some examples, the add boost brake valve may remain closed if the brake is applied and the transmission is in park. For a system that adjusts the brake booster working chamber vacuum based on brake pedal position, the add boost valve remains open allowing vacuum to be consumed as indicated by trace 304 staying at a low level. The brake pedal remains in an applied state and it begins to hold at a level. The subtract boost valve remains closed and the vehicle remains stopped and in park. Note the difference in the systems. The operator may apply the same brake force in both cases, but in the one case (where the add valve is closed at T2) the brake line pressure is lower, yet sufficient. Thus, vehicle controls prevent needless extra brake booster stroke that would consume additional vacuum.

At time T3, the add boost valve closes for systems that adjust brake booster working chamber vacuum based solely on brake pedal position as indicated by trace 304. Thus, trace 302 shows that the add brake boost valve is closed earlier than when the add brake boost valve is closed according to trace 304. As such, additional vacuum is consumed when the add brake boost valve is operated according to brake pedal position rather than the method of FIG. 4. Further, the subtract boost valve remains closed and brake booster vacuum in the working chamber of the brake booster is reduced for a system that operates the add brake boost valve according to brake pedal position as compared to a system that operates the add brake booster valve according to the method of FIG. 4. The transmission remains in park and the vehicle is stopped.

At time T4, the brake pedal is released as indicated by the brake pedal position transitioning to a lower level. The add brake boost valve remains closed as indicated by traces 302 and 304. The subtract brake boost valve opens for a system where the brake booster working chamber vacuum is adjusted solely responsive to brake pedal position (e.g., trace 308). However, the subtract brake boost valve remains closed for a system including the method of FIG. 4 (e.g., trace 306). By holding the subtract brake boost valve closed, the brake remains applied and the brake booster working chamber vacuum remains reduced to keep the brakes applied. The brake booster working chamber vacuum increases (e.g., trace 312) for the system where working chamber vacuum is adjusted solely based on brake pedal position. The brake booster working chamber vacuum remains constant (e.g., trace 310) for the system including the method of FIG. 4. Increasing the vacuum as shown in trace 312 consumes system vacuum whereas holding vacuum constant as shown in trace 310 conserves system vacuum. The transmission remains in park and the vehicle remains stopped.

At time T5, the brake pedal is applied for a second time as a pre-requisite to changing the transmission PRNDL selection. The brake is applied to allow the transmission to be shifted into drive as is shown shortly thereafter. The add boost valve is commanded open for the system that adjusts working chamber vacuum solely based on brake pedal position as indicated by trace 304. The add boost valve remains closed for the system that operates according to the method of FIG. 4 as indicated by trace 302. The brake booster working chamber vacuum decreases for the system that adjusts working chamber vacuum solely based on brake pedal position as indicated by trace 312. The brake booster working chamber vacuum remains constant for the system that operates according to the method of FIG. 4 as indicated by trace 310. Thus, additional vacuum is consumed by the system that adjusts working chamber vacuum solely based on brake pedal position. The transmission is shifted from park to drive while the brake pedal is applied and vehicle speed remains at zero.

At time T6, the brake booster working chamber pressure for the system that adjusts working chamber vacuum solely based on brake pedal position reaches a desired vacuum level in response to the brake pedal position. The add boost valve closes for the system that adjusts working chamber vacuum solely based on brake pedal position in response to the brake booster working chamber vacuum level as indicated by trace 304. The add boost valve remains closed for the system that operates according to the method of FIG. 4 as indicated by trace 302. The subtract boost valve remains closed and the transmission remains in drive while the vehicle speed is zero.

In this case, the boost is limited in the interest of providing sufficient brake line pressure but not excessive brake line pressure which would require extra vacuum consumption.

At time T7, the brake pedal is released by the driver and the subtract boost valve is opened while the add boost valve is closed for the system that operates according to the method of FIG. 4 and the system that operates the valves solely based on brake pedal position. Opening the subtract boost valve releases the vehicle brakes and allows vacuum in the brake booster working chamber to increase. The vehicle remains in drive and vehicle speed begins to increase between time T7 and time T8.

At time T8, vehicle speed is increased and the vehicle brakes are applied. The add boost valve is opened in response to applying the brake pedal and brake booster working chamber vacuum decreases as air is allowed into the brake booster working chamber. Thus, vacuum is consumed equally by the system that operates according to method 4 and the system that operates solely based on brake pedal position. The vehicle remains in drive and the vehicle begins to decelerate. Since the vehicle is moving, the brakes operate normally and no vacuum conservation measures are provided.

At time T9, the brake booster working chamber vacuum reaches a desired level that is based on brake pedal position. The add brake boost valve is closed in response to the brake booster working chamber vacuum reaching the desired level. The subtract brake boost valve remains closed and the transmission remains in drive while vehicle speed decreases. Vehicle speed reaches zero before time T10.

At time T10, the driver applies additional force and the brake pedal position is further displaced from the base brake pedal position. The add brake boost valve is opened for the system that operates solely based on brake pedal position (e.g., trace 304) in response to brake pedal position. The add brake boost valve remains closed for the system that operates according to the method of FIG. 4 (e.g., trace 302) in response to brake pedal position or force and vehicle speed. In particular, the system that operates according to the method of FIG. 4 conserves vacuum by not opening the add brake boost valve in response to vehicle speed and brake pedal force. Consequently, brake booster working chamber vacuum decreases for the system that operates solely based on brake pedal position and remains the same for the system that operates according to the method of FIG. 4. The vehicle speed remains at zero and the transmission remains in drive. Also, the subtract boost valve remains closed.

At time T11, the add brake boost valve closes for the system that operates solely based in brake pedal position in response to vacuum in the brake booster working chamber reaching a desired reduced vacuum, the desired reduced vacuum level based on the brake pedal position. The add brake boost valve remains closed for the system that operates according to the method of FIG. 4. The subtract brake boost valve remains closed. The vacuum in the brake booster working chamber for the system that operates solely based in brake pedal position is reduced as compared to the vacuum level in the brake booster working chamber for the system that operates according to the method of FIG. 4. The vehicle remains in park and the vehicle speed remains zero. At time T11 a difference between the invented system and other systems is shown. In particular, while the operator supplied brake pedal force increases at T11, the invented system (e.g., trace 310) does not add any more pneumatic boost, since the brake line pressure is already sufficient to restrain a stopped vehicle.

At time T12, the driver releases the brake and the subtract boost valve is opened for the system that operates solely based in brake pedal position and for the system that operates according to the method of FIG. 4. The brake booster working chamber vacuum increases for system that operates solely based in brake pedal position and for the system that operates according to the method of FIG. 4. The vehicle transmission remains in a forward gear and the vehicle begins to move shortly thereafter.

At time T13, the driver reapplies the brake pedal and the add brake boost valve is opened in response to the brake pedal position. The subtract brake boost valve remains closed and the brake booster working chamber vacuum begins to reduce. The vehicle remains in drive and the vehicle speed is below threshold speed 335 where the add brake boost valve may be closed to limit vacuum consumption. The vehicle remains in drive and vehicle speed begins to decrease. This illustrates the case where the invented solution not only is active at zero speed, but it also may be active for small speeds below a threshold speed.

At time T14, the brake booster working chamber vacuum is reduced to a level that stops the vehicle and the add boost valve for the system that operates according to the method of FIG. 4 closes to limit vacuum consumption in response to the brake booster working chamber vacuum. The subtract boost valve remains closed and the transmission is in drive while the vehicle is stopped.

At time T15, the brake booster working chamber vacuum is reduced to a level that stops the vehicle and the add boost valve for the system that operates according solely to brake pedal position closes to limit vacuum consumption in response to the brake booster working chamber vacuum. The subtract boost valve remains closed and the transmission is in drive while the vehicle is stopped.

Thus, the brake booster add valve may be closed sooner for the system that controls brake booster vacuum based on brake pedal position, vehicle mass, road grade, and vehicle speed. Vacuum may be consumption may be limited by limiting the amount of air that enters the brake booster working chamber.

Referring now to FIG. 4, an example method for conserving vacuum is shown. The method of FIG. 4 may be stored as executable instructions in non-transitory memory of the system shown in FIGS. 1 and 2. Further, the method of FIG. 4 may operate as shown in FIG. 3.

At 402, method 400 judges whether or not the vehicle's transmission is in park or neutral. The transmission gear may be determined from output of a gear selector sensor. If method 400 determines that the transmission is in park or neutral the answer is yes and method 400 proceeds to 404. Otherwise, the answer is no and method 400 proceeds to 410. In addition, the engine may not be started or may be in the process of being started in response to a request to start the engine at 402. For example, the engine may be being started in response to a driver depressing a push button start device.

At 404, method 400 determines whether or not the brake pedal is applied. The brake pedal position is an indication of whether or not the brake pedal is applied. If method 400 judges that the brake pedal is applied the answer is yes and method 400 proceeds to 406. Otherwise, the answer is no and method 400 proceeds to exit. The vehicle engine may be stopped or rotating at 404.

At 406, method 400 limits brake boost assist. In one example, brake boost assist is limited based on road grade, atmospheric pressure, and vehicle mass. Road grade may be determined via in inclinometer or an accelerometer. Vehicle mass may be estimated via the following equation:

$$Mv = (Tw1 - Tw2) + \frac{(Tr2 - Tr1)}{Rrr \cdot g \cdot (\sin\Theta1 - \sin\Theta2)}$$

Where Mv is mass of the vehicle, Tw1 is torque at the vehicle wheel for grade 1, Tw2 is torque at the vehicle wheel for grade 2, Rrr is driven wheel rolling radius, g is gravity constant, Tr11 is road load at driven wheel on grade 1, Tr12 is road load at driven wheel grade 2, Θ1 is road 1 angle, and Θ2 is road 2 angle.

In one example, braking force for a given brake booster pressure difference across the diaphragm is determined and stored in a function or table in memory. If the vehicle is parked or in neutral on a flat road, the table or function outputs a desired brake booster pressure difference across the diaphragm to hold the vehicle stopped (e.g., Vacuum that corresponds to 5 N-m). In one example, the base force to hold the vehicle stopped may include an additional force amount to keep the vehicle stopped due to unforeseen conditions (e.g., 5 N-m). An empirically determined function that describes braking force versus brake booster pressure difference across the diaphragm is stored in memory.

In addition, braking force may be added to the base amount of braking force based on vehicle mass and road grade. If vehicle mass is greater than a base vehicle mass, the braking force is increased as a function of vehicle mass. The increase in brake force due to vehicle mass may be empirically determined and stored in memory as a function of vehicle mass. The increase in brake force due to road grade may be empirically determined and stored in memory as a function of road grade. The increases in brake force are converted to increases in the pressure differential across the brake boost diaphragm, and the pressure differential across the diaphragm is increased or decreased to the desired pressure differential diaphragm.

The brake booster pressure difference is increased via opening the add brake boost valve which allows air to enter the brake booster working chamber. The brake booster pressure difference is decreased via opening the subtract brake boost valve and closing the add brake boost valve. The brake boost pressure differential is adjusted to the desired brake boost pressure difference which is based on the desired brake force. The pressure differential across the diaphragm is adjusted to supply the base braking force and braking force for road grade and vehicle mass in response to the brake pedal being initially applied; however, brake force is not adjusted proportionally with brake pedal position so that vacuum may be conserved. In one example, if the vehicle is in park or neutral, the pressure differential across the brake booster is maintained until the vehicle is shifted into reverse or a forward gear. Method 400 returns to 404 after brake boost assist is limited. If the transmission is in park, no compensation for road grade or vehicle mass is provided.

At 410, method 400 judges whether or not the vehicle's transmission is in neutral or in a gear. In one example, method 400 may judge that the transmission is being shifted based on a position of a gear selector. Additionally, the vehicle brake must be applied to shift from park or neutral into a gear. If method 400 judges that the transmission is being shifted from neutral or park into a gear, the answer is yes and method 400 proceeds to 412. Otherwise, the answer is no and method 400 proceeds to 430.

At 412, method 400 estimates vehicle mass and road grade. In one example, vehicle mass is determined as described at 406. Road grade is determined via an inclinometer. Method 400 proceeds 414 after vehicle mass and road grade are determined.

At 414, method 400 limits brake booster assist to limit vehicle motion while the vehicle brake pedal is applied allowing the transmission to be shifted. A base brake force to hold the vehicle stopped is estimated based on engine torque delivered to vehicle wheels, vehicle mass, road grade, and barometric pressure. Torque at the vehicle wheels produced by the engine is estimated by indexing a table or function using engine speed and load. The table outputs an engine torque and the engine torque is multiplied by factors for gear ratios between the engine and the wheels as well as for torque converter torque multiplication to determine torque at the wheels produced by the engine. Torque at the wheels from the engine is added to torque at the wheels due to road grade. Torque the wheels due to road grade is mass of the vehicle multiplied by the gravity constant multiplied by the sine of the road angle.

The desired braking force is increased to provide a braking force that is equivalent to the engine torque produced at the vehicle wheels plus the torque due to vehicle mass and road grade plus a predetermined additional amount of torque. The braking force is produced via increasing the pressure differential across the brake booster diaphragm to a pressure that produces the desired braking force. In one example, the desired braking force is input to an empirically determined function or table that outputs a desired brake booster pressure differential and the add brake boost valve and the subtract brake boost valves are adjusted (e.g., open and/or closed) to provide the desired brake booster pressure differential. The brake booster pressure differential may be measured and compared against the desired brake booster pressure differential to adjust the brake booster via closed-loop control. Method 400 proceeds to 416 after the brake booster pressure differential is adjusted. It should be noted that the brake booster pressure differential is not adjusted proportional to brake pedal position when the vehicle is stopped. In this way, vacuum consumption may be decreased.

At 416, method 400 judges whether or not the vehicle brake pedal is applied. The vehicle brake pedal may be judged applied or not applied based on brake pedal position. If method 400 judges that the brake pedal is applied, method 400 returns to 414. Otherwise, the answer is no and method 400 proceeds to 418.

At 418, method 400 increases vacuum in the brake booster working chamber and reduces the pressure differential across the brake booster diaphragm. Thus, 418 shows normal brake system operation since the brakes are not applied and the vehicle is in gear. The pressure differential across the brake booster diaphragm may be reduced via closing the add brake boost valve and opening the subtract brake boost valve in response to brake pedal release. Reducing the pressure differential across the brake booster diaphragm allows the vehicle to move. Method 400 exits after reducing the pressure differential across the brake booster diaphragm.

At 430, method 400 judges whether or not vehicle speed is less than a threshold vehicle speed (e.g., 2 KPH). If method 400 judges that vehicle speed is less than a threshold vehicle speed, method 400 proceeds to 434. Otherwise, the answer is no and method 400 proceeds to 432. In some examples, if vehicle motion is detected, brake assist is provided and vacuum consumption by the brake booster is not limited. The threshold speed in such cases may be used to reduce the uncertainty of detecting zero vehicle speed.

At 432, method 400 adjusts brake booster working chamber vacuum and/or pressure differential across the brake booster diaphragm in proportion to the position of the vehicle brake pedal. At 432, the brakes are operating normally since the vehicle is in motion. Pneumatic boost assist is not limited. For example, if the brake is being applied and brake pedal position is moving away from a base brake pedal position, the pressure differential across the brake booster is increased to increase braking force. The pressure differential across the brake booster diaphragm is increased via closing the subtract brake booster valve and opening the add brake booster valve. Braking force may be increased or decreased at 432 depending on brake pedal position. Method 400 proceeds to exit after brake booster working pressure and/or the pressure differential across the brake booster is adjusted.

At 434, method 400 judges whether or not the vehicle brake is applied. The vehicle brake may be judged applied or not applied based on brake pedal position. If method 400 judges that the brake pedal is applied, the answer is yes and method 400 proceeds to 436. Otherwise, the answer is no and method 400 proceeds to 418.

At 436, method 400 estimates vehicle mass and road grade as described at 412 and 406. Method 400 proceeds to 438 after vehicle mass and road grade are estimated. In some examples, the vehicle's engine may be automatically stopped based on vehicle operating conditions without a driver directly stopping the engine. For example, the engine may be automatically stopped when the vehicle speed is zero and engine load is less than a threshold load.

At 438, method 400 limits brake boost assist to limit vehicle motion as described at 414. Method 400 proceeds to exit after brake boost assist is limited. Thus, even if the vehicle is moving at a slow speed, the brake boost amount may be limited so as to conserve vacuum. It should also be mentioned that if the driver applies a significantly forceful braking pressure, braking force may be applied in excess of the brake booster limited brake force.

Thus, the method of FIG. 4 provides for conserving vacuum, comprising: providing vacuum to a brake booster to apply vehicle brakes when a vehicle is stopped; and stopping brake booster vacuum consumption in response to a vacuum level in a working chamber of the brake booster being less than a threshold vacuum level that stops the vehicle from moving when the vehicle is stopped or less than a threshold vehicle speed. Alternatively, stopping brake booster vacuum consumption may be in response to a vacuum level across a diaphragm of the brake booster being greater than a pressure differential that stops the vehicle from moving when the vehicle is stopped.

In some examples, the method includes where brake booster vacuum consumption comprises allowing air to flow into the working chamber. The method includes where stopping brake booster vacuum consumption is further based on an applied gear of a transmission. The method includes where the vehicle includes a transmission and where the transmission is shifted into neutral. The method includes where stopping brake booster vacuum consumption includes closing a valve that selectively allows air to flow into the working chamber.

Additionally, the includes where brake booster vacuum consumption is provided via an operator applying a brake pedal. The method further comprises adjusting the threshold vacuum for at least one of vehicle mass and road grade. The method further comprises automatically stopping an engine of the vehicle when the vehicle is stopped and stopping brake booster vacuum consumption while the engine is stopped.

In another example, the method of FIG. 4 provides for conserving vacuum, comprising: starting an engine of a vehicle in response to a request to start the engine while a transmission of the vehicle is in park; and operating a first valve to reduce vacuum use of a brake booster while a driver is applying a brake actuator and while the transmission is in park. The method includes where operating the first valve decreases air flow into the brake booster. The method further comprises opening a second valve to increase vacuum in a working chamber of the brake booster after the transmission is shifted out of park. The method further comprises opening the first valve when the transmission is in forward gear and moving. The method includes where the request to start the engine is via a push button, and where the driver is required to depress the brake actuator to start the engine.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for conserving vacuum, comprising:
   providing vacuum to a brake booster to apply vehicle brakes when a vehicle is stopped; and
   stopping brake booster vacuum consumption in response to a vacuum level in a working chamber of the brake booster being less than a threshold vacuum level that stops the vehicle from moving when the vehicle is stopped.

2. The method of claim 1, where brake booster vacuum consumption comprises allowing air to flow into the working chamber, and further comprising stopping or rotating an engine of the vehicle.

3. The method of claim 1, where stopping brake booster vacuum consumption is further based on an applied gear of a transmission.

4. The method of claim 1, where the vehicle includes a transmission and where the transmission is shifted into neutral.

5. The method of claim 1, where stopping brake booster vacuum consumption includes closing a valve that selectively allows air to flow into the working chamber.

6. The method of claim 1, where brake booster vacuum consumption is provided via an operator applying a brake pedal.

7. The method of claim 1, further comprising adjusting the threshold vacuum level for at least one of vehicle mass and road grade.

8. The method of claim 1, further comprising automatically stopping an engine of the vehicle when the vehicle is stopped and stopping brake booster vacuum consumption while the engine is stopped.

9. A method for conserving vacuum, comprising:
   starting an engine of a vehicle in response to a request to start the engine while a transmission of the vehicle is in park; and
   operating a first valve to reduce vacuum consumption of a brake booster while a driver is applying a brake actuator and while the transmission is in park.

10. The method of claim 9, where operating the first valve decreases air flow into the brake booster, and where the first valve reduces vacuum consumption before the engine is started and during engine starting.

11. The method of claim 10, further comprising opening a second valve to increase vacuum in a working chamber of the brake booster after the transmission is shifted out of park.

12. The method of claim 9, further comprising opening the first valve when the transmission is in forward gear and moving.

13. The method of claim 9, where the request to start the engine is via a push button, and where the driver is required to depress the brake actuator to start the engine.

14. A system for conserving vacuum, comprising:
   a transmission;
   vehicle brakes;
   a brake pedal;
   a vacuum brake booster coupled to the brake pedal and in communication with the vehicle brakes; and
   a controller including executable instructions stored in non-transitory memory to limit vacuum consumption via the vacuum brake booster while the transmission is being shifted and while the brake pedal is applied.

15. The system of claim 14, where the transmission is shifted from neutral or park into a forward gear.

16. The system of claim 14, further comprising additional instructions to limit air flow into the vacuum brake booster when the transmission is in park and when the brake pedal is applied.

17. The system of claim 14, further comprising an engine and additional instructions to automatically stop the engine and limit vacuum consumption via the vacuum brake booster while the engine is stopped.

18. The system of claim 14, further comprising additional instructions to control a vacuum amount in a working chamber of the vacuum brake booster based on road grade.

19. The system of claim 18, further comprising additional instructions to control the vacuum amount in the working chamber of the vacuum brake booster based on vehicle mass, and further comprising additional instructions to limit vacuum consumption when the transmission is in a forward gear and at zero vehicle speed.

20. The system of claim 14, further comprising first and second brake booster control valves and additional instructions to operate the first and second brake booster control valves in response to brake pedal position or force.

* * * * *